United States Patent [19]

Glasson

[11] 4,095,808
[45] Jun. 20, 1978

[54] ANTI ROTATION SEAL ASSEMBLY

[75] Inventor: Richard E. Glasson, Columbus, Ind.

[73] Assignee: Cummins Engine Company, Inc., Columbus, Ind.

[21] Appl. No.: 757,256

[22] Filed: Jan. 6, 1977

[51] Int. Cl.² ............................................ F16J 15/34
[52] U.S. Cl. .................................. 277/81 R; 277/136
[58] Field of Search ....................... 277/38, 39, 40, 42, 277/43, 81, 89, 136, 137

[56] References Cited

U.S. PATENT DOCUMENTS

| 2,027,505 | 1/1936 | Winkler | 277/38 |
| 2,575,818 | 11/1951 | Kosatha | 277/38 |
| 2,601,996 | 7/1952 | Sefren | 277/88 X |
| 2,856,219 | 10/1958 | Kosatha | 277/38 |
| 3,355,178 | 11/1967 | Hornaday | 277/88 X |
| 3,536,333 | 10/1970 | Gits | 277/38 X |
| 3,822,066 | 7/1974 | Keys | 277/88 X |

FOREIGN PATENT DOCUMENTS 886,045  1/1962  United Kingdom ................... 277/40

Primary Examiner—Herbert F. Ross
Attorney, Agent, or Firm—Gary M. Gron; Robert T. Ruff

[57] ABSTRACT

The disclosure illustrates an anti rotation seal assembly for use with a shaft mounted impeller or other rotatable element having a wear face. A nose portion of a carbon sealing washer is urged against the wear face by a spring contained within a non rotatable seal housing. The sealing washer has surfaces on its outer periphery which engage anti rotation elements supported by the seal housing to prevent rotation of the washer while permitting axial movement. In another form the anti rotation elements may be molded into the washer.

10 Claims, 8 Drawing Figures

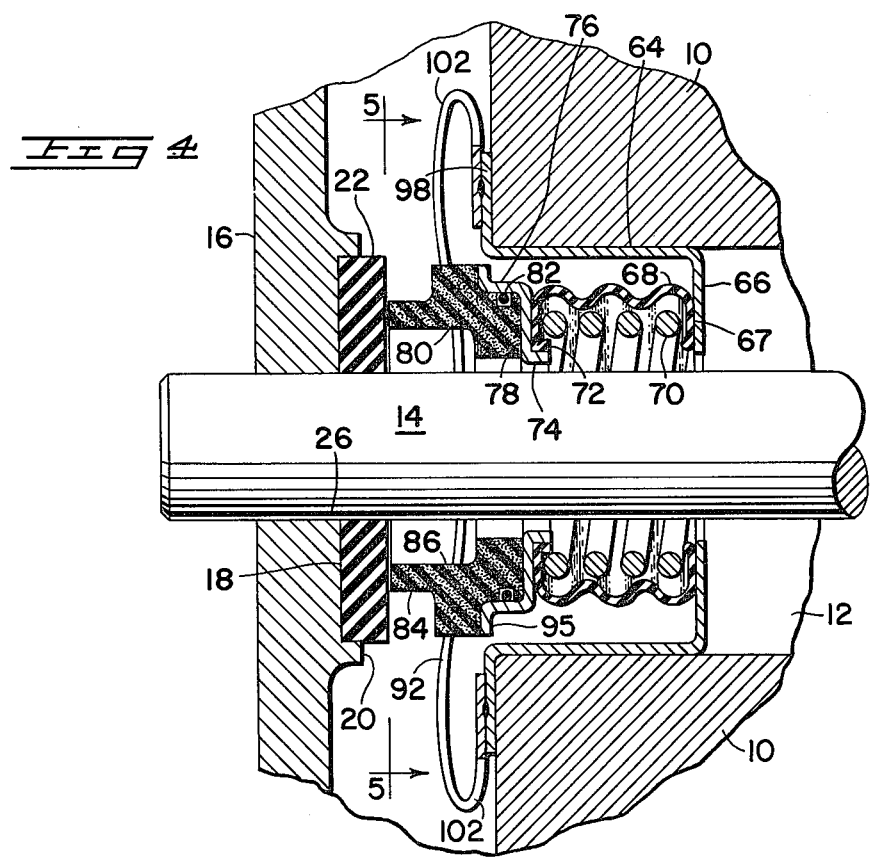
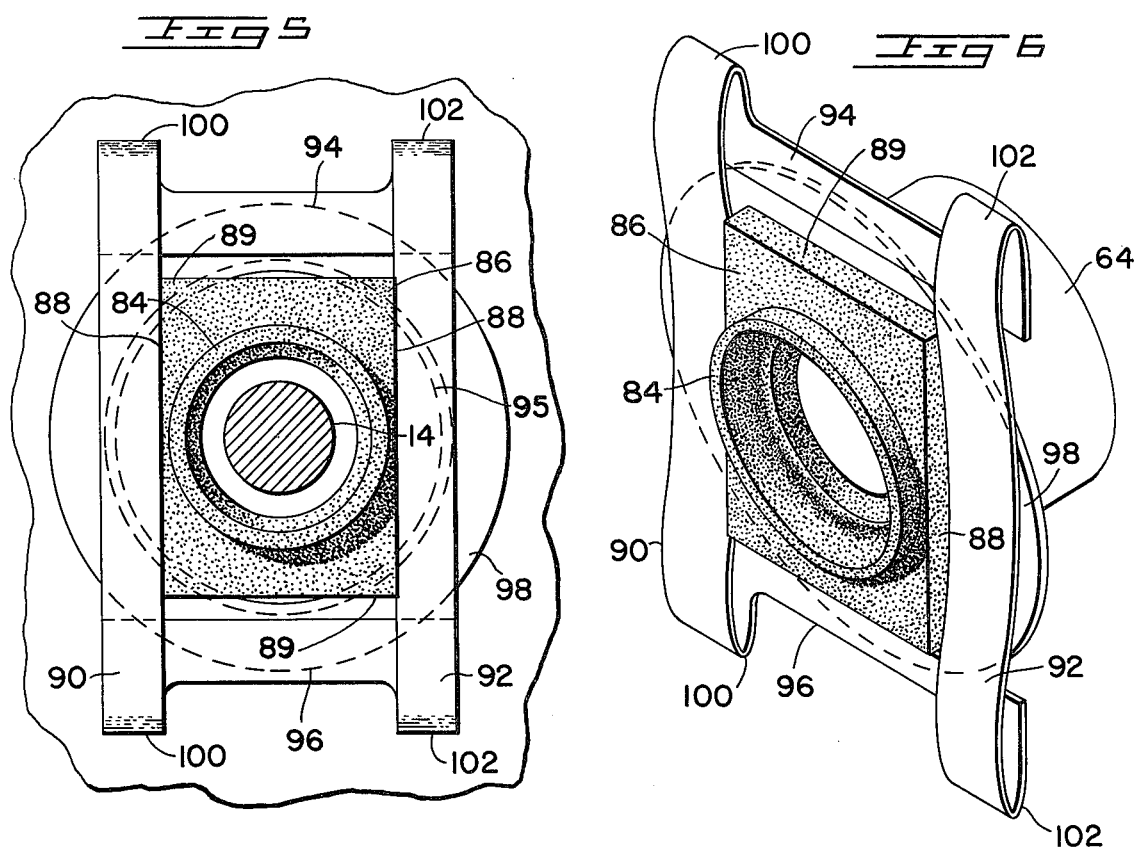

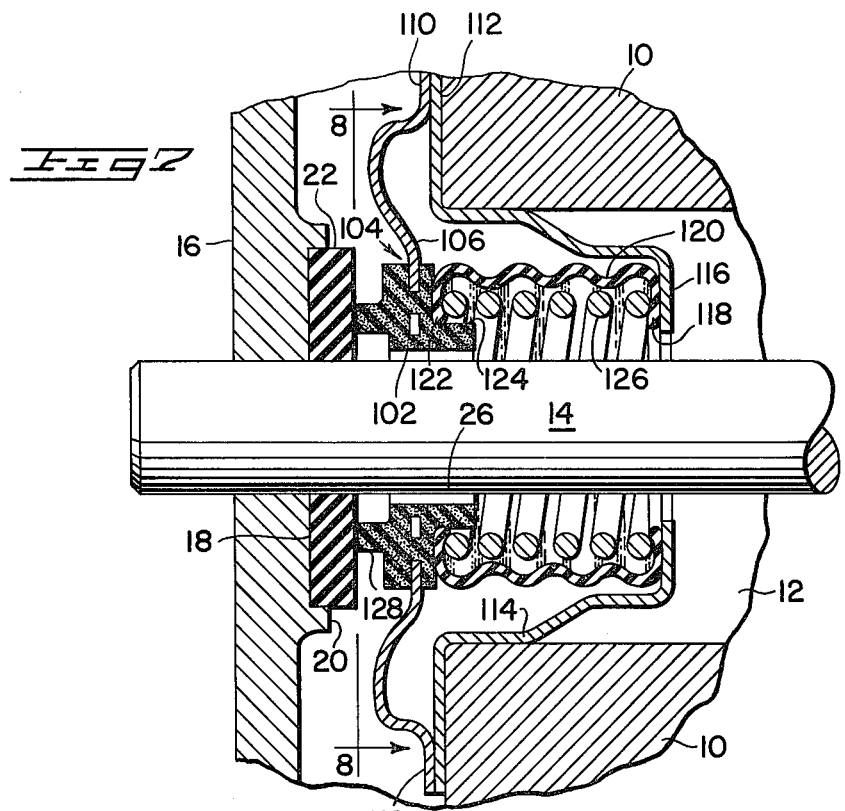
_Fig 7_
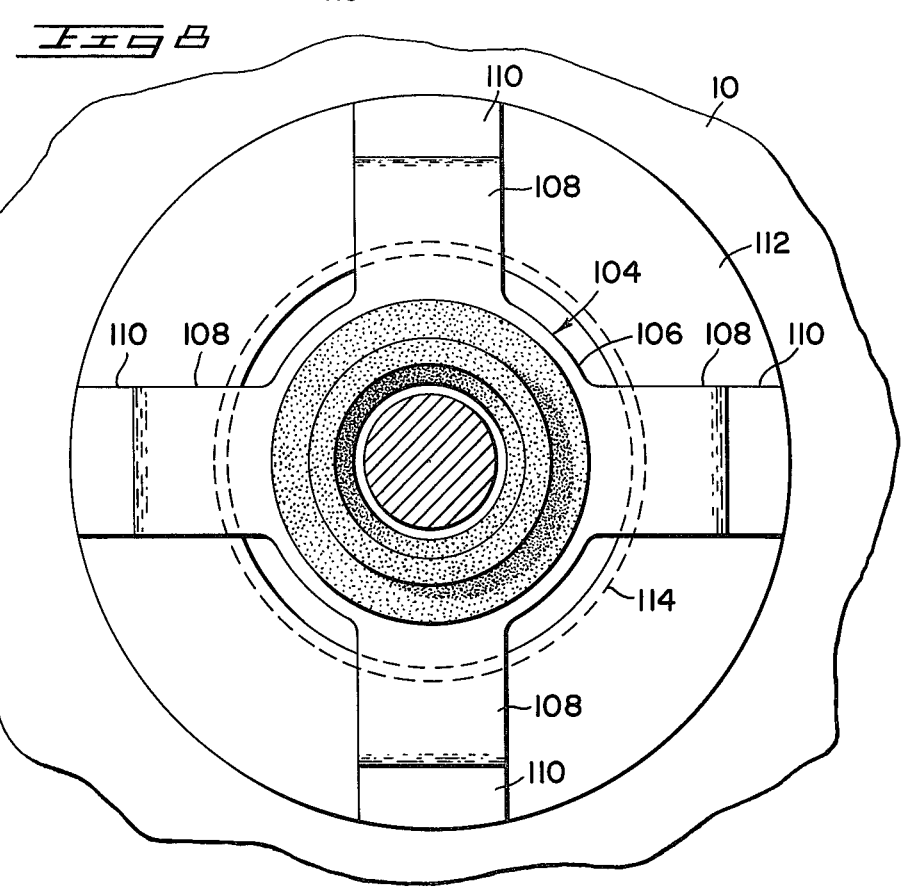
_Fig 8_

ANTI ROTATION SEAL ASSEMBLY

It is common practice to use carbon face seals when it is necessary to seal the area around a rotating shaft. Water pumps for internal combustion engines are a typical example. These seals may take the form of a bellows secured to a fixed housing and having a spring which urges a carbon seal washer against a wear face on the rotating impeller of the water pump. In operation the friction characteristics of the interface between the washer and impeller cause a variation in torque to be applied to the washer. This condition may be described as "stick-slip." The torque variations impart a cyclical twist to the bellows which may cause early fatigue failure and therefore leakage through the bellows.

In the past the carbon sealing washer has been restrained from rotation by relatively small pins or lugs engaged in slots or holes on the washer or the fixed portion of the seal. The clearance of these devices was large and produced undesirable durability.

The above problems are solved by an anti rotation seal assembly consisting of a sealing washer urged against a rotating wear face. The outer periphery of the washer has at least a pair of substantially planar surfaces which engage cooperating surfaces on an anti rotation element to restrain rotation of the washer but still permit axial movement.

Additional features and advantages of the present invention will be readily apparent from the following detailed description of an illustrative embodiment thereof when taken together with the accompanying drawings in which:

FIG. 4 is a longitudinal section view of an anti rotation seal assembly which incorporates an alternate embodiment of the present invention.

FIG. 5 is a cross sectional view taken on line 5—5 of FIG. 4, showing the anti rotation seal assembly of FIG. 4.

FIG. 6 is a perspective view of the anti rotation seal assembly of FIG. 5.

FIG. 7 is a longitudinal section view of an anti rotation seal assembly which incorporates still another embodiment of the present invention.

FIG. 8 is a view taken on line 8—8 of FIG. 7 showing the anti rotation seal assembly of FIG. 7.

Figure 1:
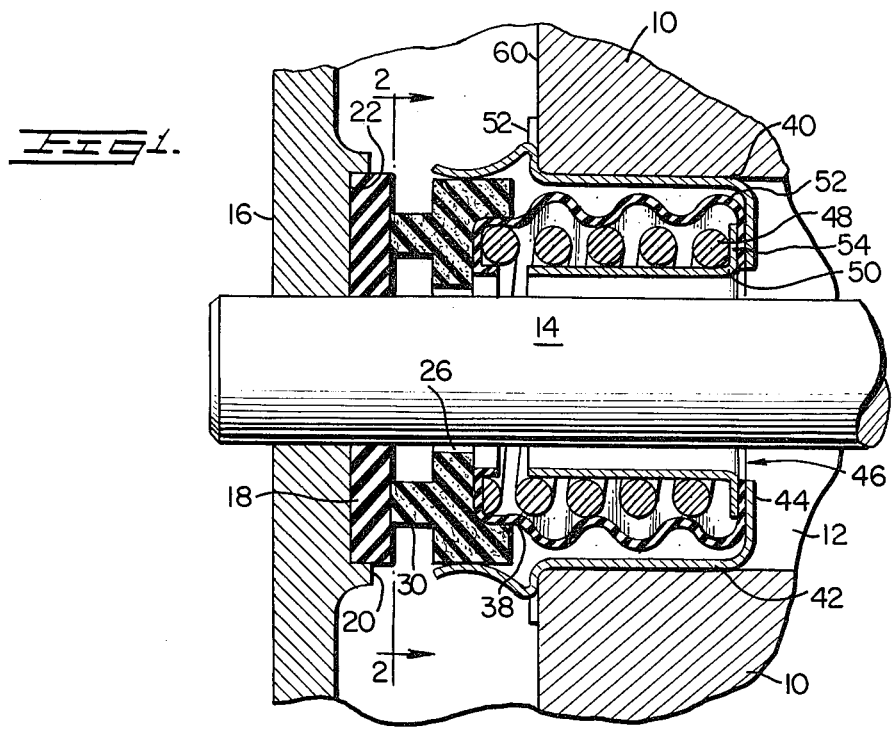
FIG. 1 is a longitudinal sectional view through a pump housing illustrating an anti rotation seal assembly embodying the present invention.
Figure 2:
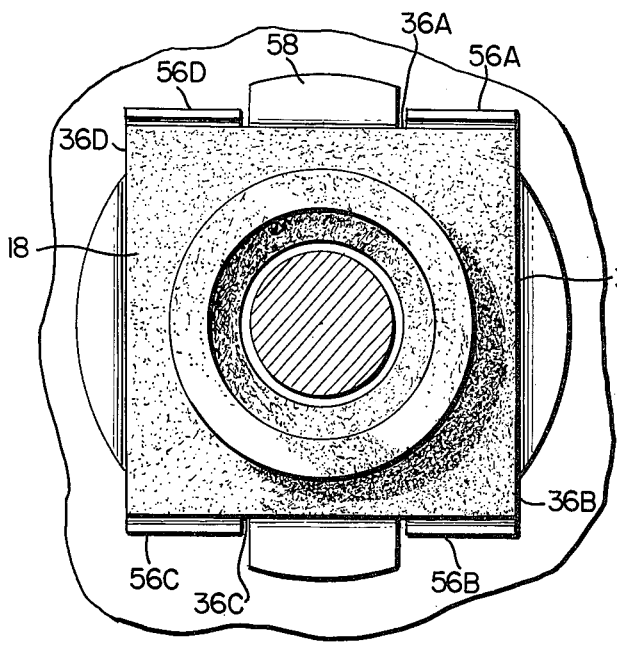
FIG. 2 is a cross section view taken on line 2—2 of FIG. 1, showing the anti rotation seal assembly of FIG. 1.
Figure 3:
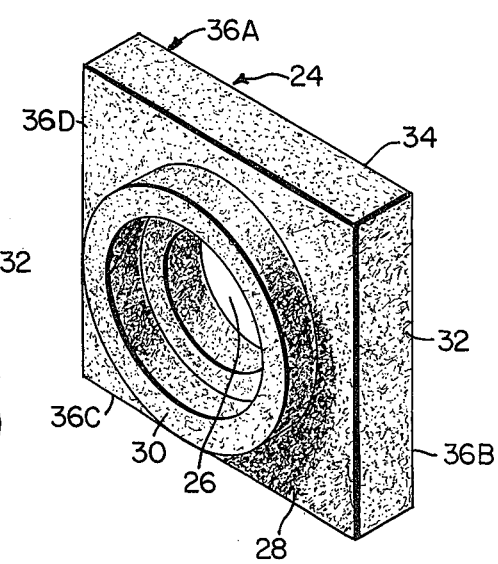
FIG. 3 is a perspective view of a carbon sealing washer incorporated in the seal assembly of FIG. 1.

Referring now in greater detail to FIGS. 1-3 there is shown a water pump housing generally designated 10 with an opening 12 through which a rotatable pump shaft 14 extends. An impeller 16 mounts on the end of shaft 14 and is fixed to the shaft for joint rotation. The inner face of the impeller carries a wear face element 18 received in a recess 22. The wear face 18 on the impeller 16 may consist of different materials but is illustrated as a ceramic or other hard material.

A carbon sealing washer 24, shown in greater detail in FIG. 3 comprises an inner annular configuration generally designated 26, including an opening whereby the washer is mounted over shaft 14. It should be apparent that sealing washer 24 and the other washers described may be formed from other types of material with equivalent results. The front face 28 of the washer has an annular extended nose portion 30, adapted for spring pressed face sealing contact with the wear face element 18 on the impeller. Additionally, and of the essence of the invention, is the configuration of the carbon sealing washer. The washer has a plate like body 32 which has an outer periphery 34 formed from a plurality of planar or flat faces or surfaces. In the embodiment shown, the body is square, and the peripheral surfaces are indicated at 36A, 36B, 36C and 36D. Other configurations could be used such as a rectangle, octagon, or other known shape, providing a plurality of flat peripheral surfaces, for reasons hereinafter to be set forth.

The carbon sealing washer additionally includes a rear annular recess 38. A seal housing 40 which can be formed from stamped out light sheet metal, has a rear portion of cylindrical configuration at 42 which is inserted in the opening 12 of housing 10 and a rear flange 44 with a central opening 46 for shaft 14.

A coil spring 48 is telescoped over a spring cage 50. Cage 50 is positioned in housing 40 to urge nose portion 30 of washer 24 against the wear surface 18. A rubber or elastomeric bellows 52 is mounted between cage 50 and seal housing 40, in a liquid tight seal between rear flange 44 of housing 40 and rear flange 54 of cage 50. The front end of the bellows is in sealing engagement with the inner surface of rear annular recess 38 of the carbon sealing washer 24.

A plurality of bent fingers 56A, 56B, 56C and 56D are formed as extensions of the body of seal housing 40. The configuration is such that the fingers extend in a direction generally parallel to the axis of rotation of shaft 14 to provide resilient or spring biased contact between the fingers and the extended flat surfaces of the carbon sealing washer, as more clearly shown in FIG. 2. The seal housing 40 also is provided with ears 58 which abut the front face 60 of the pump housing 10. These ears help to position the seal housing 40 in the opening 12 of the housing 10. These fingers have substantial width and are in spring pressed contact with the planar surfaces of the washer 24, thereby effectively restraining it from rotation. At the same time however, the fingers permit sliding axial movement of washer 24 to accomodate wear between the parts and axial end play of shaft 14.

If it is desired to eliminate the sliding movement between the fingers 56A-D and the periphery of washer 24, the anti rotation seal assembly 62 of FIGS. 4-6 is used. This seal assembly is used with the same shaft, impeller, wear face and housing shown in FIG. 1. The seal assembly comprises an annular seal housing 64 received in opening 12 of housing 10. Housing 64 has a rear flange 66 which provides a sealed abutment for the rear flange 67 of an annular flexible bellows 68. Bellows 68 is urged toward its expanded position by a spring 70 which abuts the rear flange 67 and a front flange 72 of bellows 68. Front flanges 72 of bellows 68 is pressed over an inner projection 74 of an annular seal washer carrier 76.

A pair of leaf springs 90, 92 extend generally in a plane that is normal to the axis of rotation of shaft 14 and are secured at about their mid point to an outward flange 95 of carrier 76. The ends of springs 90, 92 are interconnected by integral webs 94, 96 which are secured to an outward flange 98 of seal housing 64. The above elements may be secured by spot welding or other suitable process. The leaf springs 90, 92 are bowed and have curved end sections 100, 102 connecting with the webs 94, 96 to permit the center of springs 90, 92 to flex in an axial direction.

Carrier 76 has a flange section 78 providing an abutment for the rear of a carbon sealing washer 80 pressed into carrier 76 to restrain washer 80 from rotation. An o-ring 82 provides an effective seal between the two elements. The washer 80 includes a nose portion 84 which is urged into engagement with wear face 18 by spring 70. Washer 80 also has a center section 86 having generally unencumbered planar surfaces 88, 89 facing outward. The surfaces 88 engage the edges of the leaf springs 90, 92 to keep washer 80 from rotating if the press fit in carrier 76 should loosen up.

The seal assembly 62 has the same advantages as the assembly of FIGS. 1-3 in restraining the sealing washer from rotation while permitting axial movement. In addition, it eliminates the potential wear surface between the fingers and washer by securing the springs directly to the carrier for the washer.

The seal assembly of FIGS. 7 and 8 goes a step further and eliminates a separate carbon sealing washer carrier. In this embodiment a carbon sealing washer 102 is molded around a leaf spring assembly 104. The assembly 104 has an annular center section 106 partially embedded in the unencumbered periphery of washer 102 and a plurality of outward projecting leaf springs 108. As seen in FIG. 7, the springs 108 are bowed and have their tips 110 suitably secured to a flange 112 of a seal housing 114, e.g. by spot welding.

The housing 114 has a rear flange 116 which abuts a rear flange 118 of a bellows 120. The bellows 120 has a forward flange 122 which is received over an annular projection 124 of washer 102. A spring 126 within bellows 120 expands it so that an annular nose portion 128 on washer 102 is urged into wear face 18. The leaf springs 108 keep sealing washer 102 from rotating but permit it to translate axially.

In all of the above assemblies, the fingers or leaf springs resist the torsional fluctuations generated at the interface between the sealing washer and wear surface. As such the bellows is substantially isolated and does not experience the cyclical twisting. Such a condition enables a great lengthening of the effective seal life. The term unencumbered is used herein to mean the periphery has no gaps, protrusions or irregular surface direction.

While a preferred embodiment has been shown in the drawings and described above minor changes in details of construction and/or materials can be made without departing from the spirit and scope of the invention as defined and limited by the appended claims.

I claim:

1. An anti rotation seal assembly for use with a rotatable shaft having an annular wear surface thereon, said assembly comprising:
   a non rotatable seal housing,
   a bellows assembly positioned within said housing;
   a sealing washer having an annular nose portion adapted to engage said wear surface,
   means for urging said sealing washer toward said wear surface to maintain a seal therebetween,
   a pair of parallel substantially planar outwardly facing surfaces formed on said sealing washer;
   a pair of flexible tabs secured to said seal housing and extending in a direction parallel to the central axis of said nose portion for yieldingly engaging said substantially planar surfaces, said tabs providing spring biased contact against said parallel planar surfaces for restraining relative rotation of said sealing washer while permitting longitudinal movement thereon.

2. Apparatus as in claim 1 wherein:
   said sealing washer has four substantially planar surfaces in a square shaped configuration thereby forming the periphery of said washer.

3. Apparatus as in claim 2 having four tabs shaped to engage said planar surfaces, said tabs being positioned on opposite sides of the central axis of said nose portion.

4. An anti rotation seal assembly for use with a rotatable shaft having an annular wear surface thereon, said assembly comprising:
   a non rotatable seal housing,
   a bellows assembly positioned within said housing;
   a sealing washer having an annular nose portion adapted to engage said wear surface and a peripheral surface unencumbered by gaps or indentations,
   means for urging said sealing washer toward said wear face to maintain a seal therebetween,
   at least one leaf spring secured to said housing,
   said leaf spring non rotatably securing said seal washer to said housing
   said leaf spring extending generally in a plane normal to the central axis of said nose piece and engaging said unencumbered peripheral surface, whereby said leaf spring prevents relative rotation of said seal washer but permits axial movement.

5. Apparatus as in claim 4 wherein:
   said securing means comprises a seal washer carrier supporting said seal washer against rotation relative to one another,
   said apparatus includes a pair of leaf springs positioned on opposite sides of the central axis of said nose piece, said leaf springs being interconnected at their ends by integral webs secured to said seal housing and secured to said seal carrier at about their midsection.

6. Apparatus as in claim 5 wherein:
   said sealing washer has a pair of outwardly facing planar faces engaging the side edges of said leaf springs whereby said sealing washer is restrained from rotation in the event its support with said seal carrier permits relative rotation.

7. Apparatus as in claim 5 wherein said leaf springs are bowed at their midsection and have ends curved inward to connect with said webs.

8. Apparatus as in claim 4 wherein said leaf spring comprises an assembly having an annular center section molded into said sealing washer and at least two leaf springs extending generally in a plane normal to the central axis of said nose portion and having their ends secured to said seal housing.

9. Apparatus as in claim 8 wherein said leaf springs are bowed and extend radially from said annular center section.

10. Apparatus as in claim 9 wherein said leaf spring assembly has four leaf springs each extending from said annular center section.

* * * * *